US012249267B2

(12) United States Patent
Shin et al.

(10) Patent No.: US 12,249,267 B2
(45) Date of Patent: Mar. 11, 2025

(54) DISPLAY APPARATUS AND METHOD FOR CONTROLLING THE SAME

(71) Applicant: LX Semicon Co., Ltd., Daejeon (KR)

(72) Inventors: Hyeon Woon Shin, Daejeon (KR); Jin Han Yoon, Daejeon (KR); Ho Min Lim, Daejeon (KR)

(73) Assignee: LX SEMICON CO., LTD., Daejeon (KR)

(*) Notice: Subject to any disclaimer, the term of this patent is extended or adjusted under 35 U.S.C. 154(b) by 0 days.

(21) Appl. No.: 18/532,216

(22) Filed: Dec. 7, 2023

(65) Prior Publication Data

US 2024/0194118 A1 Jun. 13, 2024

(30) Foreign Application Priority Data

Dec. 7, 2022 (KR) ........................ 10-2022-0169612
Oct. 24, 2023 (KR) ........................ 10-2023-0142892

(51) Int. Cl.
*G09G 3/20* (2006.01)
*G09G 3/36* (2006.01)

(52) U.S. Cl.
CPC ......... *G09G 3/2096* (2013.01); *G09G 3/3607* (2013.01); *G09G 2310/08* (2013.01); *G09G 2320/046* (2013.01); *G09G 2320/0626* (2013.01); *G09G 2340/0471* (2013.01); *G09G 2340/0478* (2013.01); *G09G 2340/16* (2013.01); *G09G 2360/16* (2013.01)

(58) Field of Classification Search
CPC ............... G09G 3/2096; G09G 3/3607; G09G 2310/08; G09G 2310/046; G09G 2320/0626; G09G 2340/0471; G09G 2340/0478; G09G 2340/16; G09G 2360/16
See application file for complete search history.

(56) References Cited

U.S. PATENT DOCUMENTS

2016/0073083 A1* 3/2016 Hagiwara ............ H04N 13/128 382/232
2019/0156726 A1* 5/2019 Chun ................... G09G 3/3291

OTHER PUBLICATIONS

Extended European Search Report dated Feb. 27, 2024, issued for the corresponding European patent application EP 23214486.5 (12 pages).

* cited by examiner

*Primary Examiner* — Robert J Michaud
(74) *Attorney, Agent, or Firm* — POLSINELLI PC

(57) ABSTRACT

A method for controlling a display apparatus, including calculating at least one of a complexity or an average picture level (APL) of the received image signal, determining a final shift time of pixels based on the at least one of the calculated complexity or APL of the image signal, and shifting the received image signal in a horizontal direction or a vertical direction and outputting the shifted image signal, based on track coordinate information stored in a memory and the determined final shift time of the pixels.

19 Claims, 11 Drawing Sheets

| order | x | y |
|---|---|---|
| 1 | 0 | 0 |
| 2 | 1 | 1 |
| 3 | 2 | 2 |
| 4 | 3 | 3 |
| ... | | |
| 37 | -4 | -4 |
| 38 | -3 | -3 |
| 39 | -2 | -2 |
| 40 | -1 | -1 |

DISPLAY APPARATUS AND METHOD FOR CONTROLLING THE SAME

CROSS-REFERENCE TO RELATED APPLICATION

This application claims the priority of Korean Patent Application Nos. 10-2022-0169612, filed on Dec. 7, 2022 and 10-2023-0142892 filed on Oct. 24, 2023, which are hereby incorporated by reference in their entirety.

BACKGROUND

Field of the Disclosure

The present disclosure relates to a display apparatus. Examples of the display apparatus include a liquid crystal display (LCD), an organic light-emitting diode (OLED) display, a mini light-emitting diode (mini LED) display, a micro light-emitting diode (micro LED) display, and a quantum dot light-emitting diode (QLED) display. However, the present disclosure is not limited to any particular apparatus. Furthermore, the display apparatus referred to herein may be, for example, a finished product itself (e. g., TV, digital signage, cell phone, car navigation, etc.) or a component (e. g., driver IC, T-CON, etc.) that controls the display module.

Description of the Background

Recently, various display apparatuses have been proposed, but burn-in is still an issue.

For example, if the same image is left on the display apparatus, or the image of a broadcaster whose position is fixed on each channel is continuously exposed on the screen, the color cannot be represented properly on the corresponding part or a residual image (smudge) is left on the screen, which is called burn-in.

The aforementioned burn-in phenomenon may cause problems in a variety of display apparatuses. The following discussion will focus on OLEDs as an example.

Burn-in occurs in OLED display apparatuses because OLED display apparatuses are made up of organic materials. OLEDs are vulnerable to light and heat, and their brightness and color reproduction decrease with increasing use.

In particular, if a particular color is displayed steadily for a long period of time, the lifespan of the pixels used decreases, and the screen starts to look smudged. Eventually, this leads to a burn-in effect, where the smudge remains permanently on the screen as an afterimage.

To address this issue, the conventional technology attempts to reduce degradation by scaling (zooming in or out) the image signal to move a fixed image. In other words, the amount of pixel movement is adjusted depending on whether the image signal is a still image or a rapidly changing moving image.

However, according to the above-mentioned conventional technology, the amount of pixel movement increases when the image is a still image, and thus may be easily perceived by the user's eyes.

Furthermore, according to the conventional technology, a separate scaler is required to realize the zoom-in/zoom-out function.

SUMMARY

One of the aspects of the present disclosure is intended to prevent degradation by shifting a fixed image by shifting the entire image signal.

One of the aspects of the present disclosure provides a novel system that reduces the likelihood of a user perceiving a change and eliminates the need for a separate scaler by adjusting the period (time) of pixel shift, rather than adjusting the amount of pixel shift.

To achieve these and other advantages and in accordance with the purpose of the disclosure, as embodied and broadly described herein, a display apparatus may include an interface configured to receive an image signal, a memory having track coordinate information stored therein, a first calculator configured to calculate a complexity of the received image signal, a second calculator configured to calculate an average picture level (APL) of the received image signal, and a controller configured to determine a final shift time of pixels based on the calculated complexity and APL of the image signal and to control the received image signal to be shifted in a horizontal direction or a vertical direction based on the track coordinate information stored in the memory and the determined final shift time of the pixels.

The complexity of the received image signal may be inversely proportional to the final shift time of the pixels, whereas the APL of the received image signal may be proportional to the final shift time of the pixels.

For example, the controller may determine the final shift time as a product of a default time, a first gain of a shift time according to the calculated complexity of the image signal, and a second gain of a shift time according to the calculated APL of the image signal. Further, the first gain and the second gain may be, for example, in a range of 0 to 1.

A plurality of sets of the track coordinate information may be stored in the memory, wherein a set of the track coordinate information may be randomly selected from among the sets of track coordinate information after an end of the final shift time of the pixels.

The shift of the image signal in the horizontal may be limited to a maximum of 10 pixels, and the shift of the image signal in the vertical direction may be limited to a maximum of 5 pixels.

In another aspect of the present disclosure, a method for controlling a display apparatus may include receiving an image signal, calculating at least one of a complexity or an average picture level (APL) of the received image signal, determining a final shift time of pixels based on the at least one of the calculated complexity or APL of the image signal, and shifting the received image signal in a horizontal direction or a vertical direction and outputting the shifted image signal, based on track coordinate information stored in a memory and the determined final shift time of the pixels.

It is also within the scope of the present disclosure for a third party to implement a computer-readable medium (e.g., application, memory, software, etc.) having recorded thereon a program that performs any of the above-described methods and various aspects described herein.

According to one of the aspects of the present disclosure, by shifting a fixed image by shifting the entire image signal, degradation may be prevented.

Furthermore, according to one of the aspects of the present disclosure, a novel system that reduces the likelihood of a user perceiving a change and eliminates the need for a separate scaler by adjusting the period (time) of pixel shift, rather than adjusting the amount of pixel shift may be provided.

It is apparent that in addition to the technical effects described above, effects that may be inferred by those skilled in the art from the specification as a whole should also be considered.

BRIEF DESCRIPTION OF THE DRAWINGS

The accompanying drawings, which are included to provide a further understanding of the disclosure and are incorporated in and constitute a part of this application, illustrate various aspects of the present disclosure and together with the description serve to explain the principle of the present disclosure.

In the drawings:

FIG. 2A and FIG. 2B illustrate a result output by a display apparatus of one aspect of the present disclosure by shifting a still image or the like;

FIG. 3 illustrates an exemplary track along which a display apparatus according to one aspect of the present disclosure shifts a still image or the like;

DETAILED DESCRIPTION

Hereinafter, aspects disclosed herein will be described in detail with reference to the accompanying drawings. Wherever possible, the same reference numbers will be used throughout the drawings to refer to the same or like parts, and redundant descriptions thereof will be omitted. The suffixes "module" and "unit" of elements herein are used for convenience of description and thus are used interchangeably and do not have any distinguishable meanings or functions.

Further, in describing the aspects disclosed in this specification, if a detailed description of related known techniques would unnecessarily obscure the gist of the aspects disclosed in this specification, detailed description thereof will be omitted. In addition, the attached drawings are provided for easy understanding of the aspects disclosed in this specification and do not limit technical idea disclosed in this specification, and the aspects should be construed as including all modifications, equivalents, and alternatives falling within the spirit and scope of the present disclosure.

Terms containing ordinal numbers, such as first and second may be used to describe various components, but the components are not limited by such terms. These terms are used only to distinguish one component from another. When a component is described as being "connected" or "linked" to another component, it should be understood that it may be directly connected or linked to the other component, but there may be other components in between.

On the other hand, when a component is described as being "directly coupled" or "connected" to another component, it should be understood that there is no other component between the connected or coupled components.

As used herein, the singular forms "a," "an," and "the" include plural referents unless context clearly dictates otherwise.

In this specification, terms such as "includes" or "has" are intended to specify the presence of the features, numbers, steps, operations, components, parts, or combinations thereof disclosed in the specification, and are not to be understood as precluding the possibility of the presence or addition of one or more other features, numbers, steps, operations, components, parts, or combinations thereof.

Figure 1:
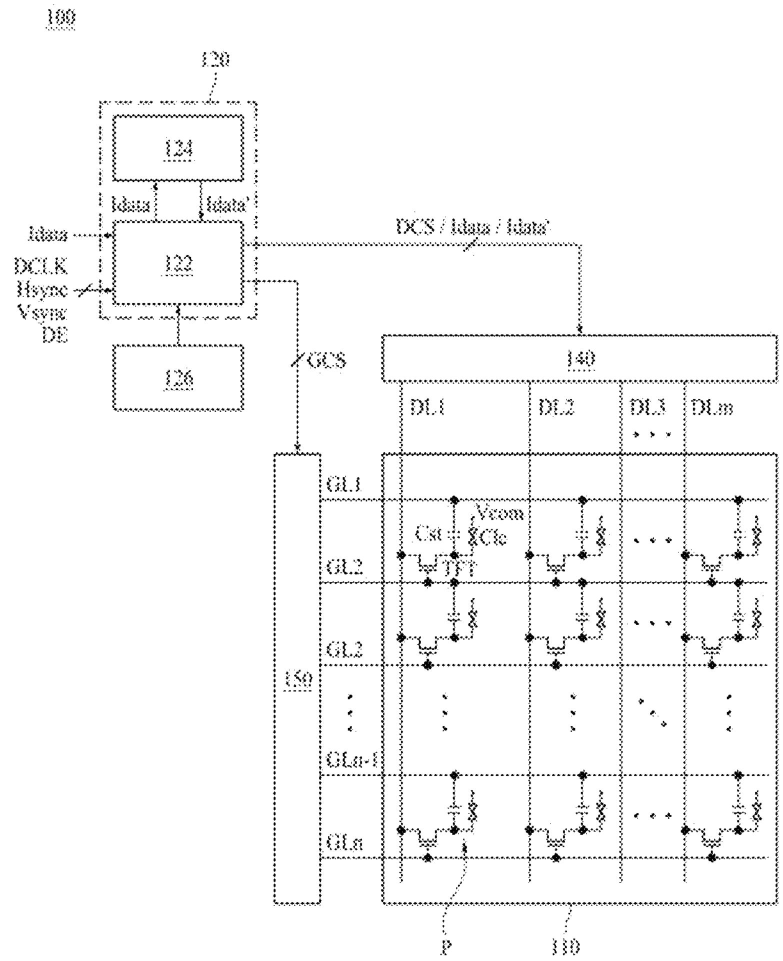
FIG. 1 is a diagram illustrating a configuration of a display apparatus according to one aspect of the present disclosure.

FIG. 1 is a diagram illustrating a configuration of a display apparatus according to one aspect of the present disclosure.

As shown in FIG. 1, a display apparatus 100 according to one aspect of the present disclosure includes a display panel 110, a display driver 120, a data driver 140, and a gate driver 150. However, some modules may be added, removed, or changed according to the needs of those skilled in the art.

The display panel 110 includes a plurality of gate lines GL1-GLn and a plurality of data lines DL1-DLm that are arranged crosswise to each other to define a plurality of pixel regions, and pixels P provided in each of the plurality of pixel regions.

The plurality of gate lines GL1-GLn may be arranged in a horizontal direction and the plurality of data lines DL1-DLm may be arranged in a vertical direction. However, aspects are not necessarily limited thereto.

In one aspect, the display panel 110 may be a liquid crystal display (LCD) panel. When the display panel 110 is an LCD panel, the display panel 110 includes thin-film transistors (TFTs) formed in the pixel regions P defined by the plurality of gate lines GL1-GLn and the plurality of data lines DL1-DLm, and liquid crystal cells connected to the TFTs.

Of course, the present disclosure is applicable not only to LCDs, but also to micro LEDs, mini LEDs, OLEDs, and the like.

The TFTs supply data signals supplied through the data lines DL1-DLm to the liquid crystal cells in response to scan pulses supplied through the gate lines GL1-GLn.

The liquid crystal cell includes a common electrode and a sub-pixel electrode facing each other across the liquid crystal, the subpixel electrode being connected to a TFT. Thus, it may be equivalently represented as a liquid crystal capacitor Clc. Such a liquid crystal cell includes a storage capacitor Cst connected to the previous gate line to maintain the data signal charged in the liquid crystal capacitor Clc until the next data signal is charged.

A pixel region of the display panel 110 may include red (R), green (G), and blue (B) subpixels. In one aspect, the subpixels may be repeatedly arranged in order of R, G, and B within one horizontal line. In this case, in two adjacent horizontal lines, two subpixels connected to the same data line may be configured as subpixels of different colors. To this end, the first horizontal line may set the last subpixel as a dummy pixel, and the second horizontal line adjacent to the first horizontal line may set the first subpixel as a dummy pixel, such that two subpixels of different colors in the first and second horizontal lines may be connected to the same data line.

While the display panel 110 has been described as an LCD panel in the above-described aspect, the display panel 110 may be an organic light emitting diode (OLED) panel in which three-color subpixels are formed in each pixel region.

Also, while the display panel 110 has been described as having three-color subpixels in the aspect described above, the display panel 110 may have red (R), green (G), blue (B), and white (W) subpixels in other aspects.

The display driver 120 is configured to drive the display panel, and includes a timing controller 122 and an overdriving controller 124.

The timing controller 122 receives various timing signals, including a vertical synchronization signal Vsync, a horizontal synchronization signal Hsync, a data enable (DE) signal, and a clock signal CLK, from an external system (not shown) and generates a data control signal (DCS) to control the data driver 140 and a gate control signal (GCS) to control the gate driver 150.

In one aspect, the DCS may include a source start pulse (SSP), a source sampling clock (SSC), and a source output enable signal, and the GCS may include a gate start pulse (GSP), a gate shift clock (GSC), and a gate output enable signal.

Here, the SSP controls the timing of the start of data sampling of one or more source driver integrated circuits (ICs) constituting the data driver 140. The SSC is a clock signal that controls the sampling timing of data in each of the source driver ICs. The source output enable signal controls the output timing of the data driver 140.

The GSP controls the timing of the start of operation of one or more gate driver ICs that constitute the gate driver 150. The GSC, which is a clock signal input to the one or more gate driver ICs in common, controls the shift timing of the scan signal (gate pulse). The gate output enable signal specifies the timing information about the one or more gate driver ICs.

Further, the timing controller 122 forwards image data Idata received from an external system (not shown) to the overdriving controller 124. The timing controller 122 receives pixel data (Idata) corresponding to the image data or overdrive pixel data Idata' from the overdriving controller 124, converts the same into a data signal processable by the data driver 140, and outputs the data signal to the data driver 140.

The overdriving controller 124 determines whether the current subpixel is overdriven by comparing the current subpixel with a previous subpixel on a per horizontal line basis in the image data. When the overdriving controller 124 determines that the current subpixel is overdriven, it generates overdriven pixel data about the current subpixel.

Figure 2A:
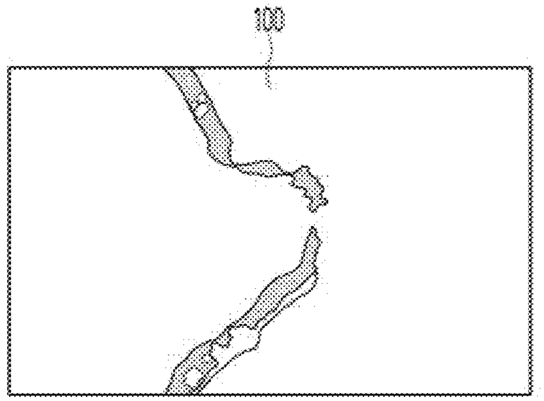
Figure 2B:
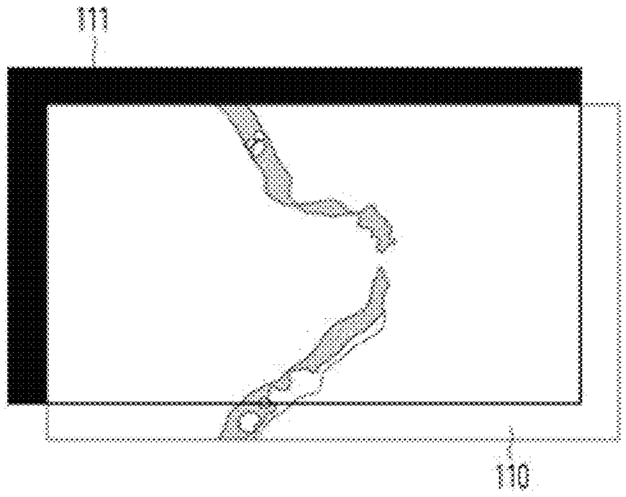

FIG. 2A and FIG. 2B illustrate a result output by a display apparatus of one aspect of the present disclosure by shifting a still image or the like.

As shown in FIG. 2A of FIG. 2, when a conventional still image 100 is fixedly output, issues such as the degradation of image quality occur.

On the other hand, according to one aspect of the present disclosure, as shown in FIG. 2B of FIG. 2, the entire image signal 110 is shifted to mitigate the degradation as the fixed image is shifted. In addition, as the entire image signal is shifted, the portion of the image signal that is shifted out of the screen is deleted, and the blank area 111 is output in black.

In particular, in the present disclosure, the amount of pixel shifting is not adjusted, but the period (time) of pixel shifting is adjusted. The amount of pixel shifting is fixed to, for example, one pixel at a time, while the period (time) of pixel shifting is designed to be automatically adjustable.

More specifically, for example, the period (time) of pixel shifting may be adjusted according to the complexity of the image signal. In the case where the complexity of the image signal is high, there are many edges, and thus the degradation is highly likely to increase. Therefore, in this case, it is important to reduce the time interval between pixel shifts.

As another example, it is also necessary to consider adjusting the period (time) of pixel shifting based on the average picture level (APL) of the image signal. When the APL is low, the peak luminance becomes higher, which increases the possibility of severe degradation. Therefore, in this case, it is important to reduce the time interval between pixel shifts.

Of course, manual adjustments are also within the scope of the present disclosure.

The path along which the pixels are shifted may be named a track. The track may be input (edited) through an external interface such as i2c (Inter-Integrated Circuit).

Whether it is an automatic operation or a manual operation, the entire image is shifted along the track based on the center point (0, 0). Related details will be described below with reference to FIG. 2A and FIG. 2B.

Figure 3:
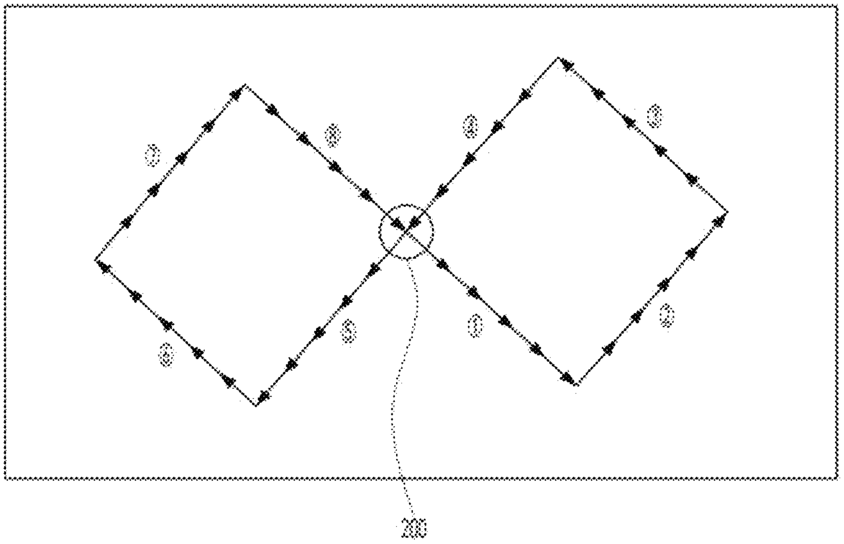

FIG. 3 illustrates an exemplary track along which a display apparatus according to one aspect of the present disclosure shifts a still image or the like.

As described above, the entire image is shifted up, down, left, and right by one pixel at a time to mitigate the degradation caused by a fixed image. However, it is important that the shifting is performed as slowly as possible (e.g., within 180 seconds or 120 seconds) to be unrecognizable to the user.

For example, as shown in FIG. 3, to mitigate the degradation caused by the fixed image, the entire image is shifted by one pixel with respect to the center point (0,0) 200 along the paths (1), (2), (3), (4), (5), (6), (7), and (8).

However, the present disclosure is not necessarily limited to the numerical values described below. It is also within the scope of the present disclosure to limit the shift to a maximum of +/−10 pixels in the horizontal direction H, and to limit the shift to a maximum of +/−5 pixels in the vertical direction V, as shown in FIG. 3.

Of course, as the maximums increase, the effectiveness of mitigating degradation increases. However, as the maximum pixel shift increases (particularly in the vertical direction), the amount of line memory (e.g., static random access memory (SRAM)) required increases, which may lead to a larger logic size and thus higher costs.

In view of this issue, it is within the scope of the present disclosure to limit the shift to the aforementioned maximum value.

Figure 4:
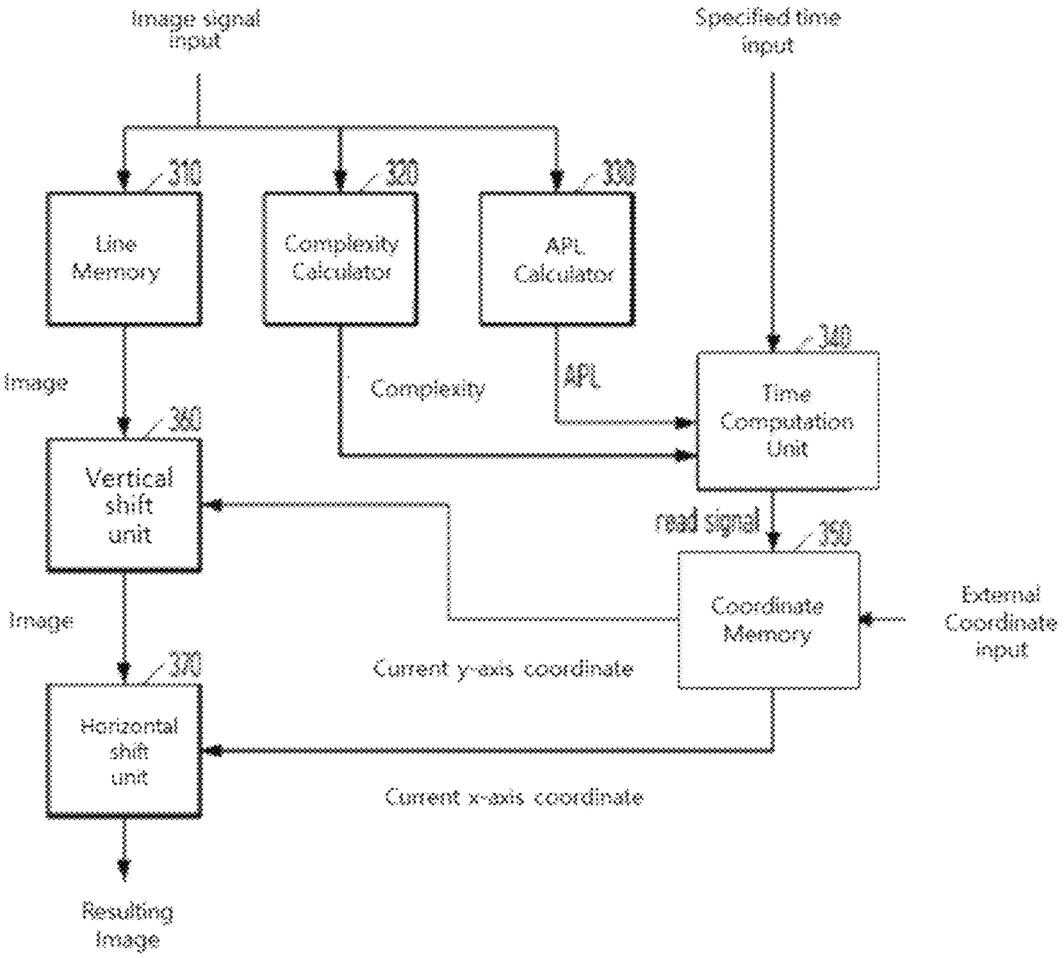
FIG. 4 is a block diagram illustrating components of a display apparatus according to one aspect of the present disclosure.

FIG. 4 is a block diagram illustrating components of a display apparatus according to one aspect of the present disclosure.

A display apparatus according to one aspect of the present disclosure includes a line memory 310, a complexity calculator 320, an APL calculator 330, a time computation unit 340, and a coordinate memory 350. However, the scope of this disclosure is to be determined in accordance with the appended claims.

The line memory 310 serves as a buffer to store a received image signal for a certain time.

For example, in a register-transfer-level (RTL) design, image processing is performed in real time, and thus shifting the image signal in the vertical direction requires that corresponding line data (RGB values) be stored in the line memory 310 (e.g., SRAM, etc.) and then retrieved and used.

Further, although not shown in FIG. 4, the image signal may be received from a module outside or inside the display apparatus via an interface (not shown).

The coordinate memory 350 stores track coordinate information. The track coordinate information will be described in more detail below with reference to FIG. 8 and the like.

The complexity calculator 320 calculates the complexity of the received image signal. This calculator may be referred to as a first calculator.

The APL calculator 330 calculates the APL of the received image signal. This calculator may be referred to as a second calculator.

The time computation unit 340 determines the final shifting time of pixels based on the calculated complexity and APL of the image signal.

Then, based on the track coordinate information stored in the coordinate memory 350 and the determined final shift time of pixels, the received image signal is shifted in the vertical direction unit (360) and is shifted in the horizontal direction unit (370).

However, an element that performs the functions of the time computation unit 340 and the coordinate memory 350 described above may be referred to as a controller in the present disclosure.

It is necessary to design the complexity of the received image signal to be inversely proportional to the final shift time of pixels. On the other hand, it is necessary to design the APL of the received image signal to be proportional to the final shift time of pixels. Related details will be described later with reference to FIGS. 6 and 7.

Figure 5:
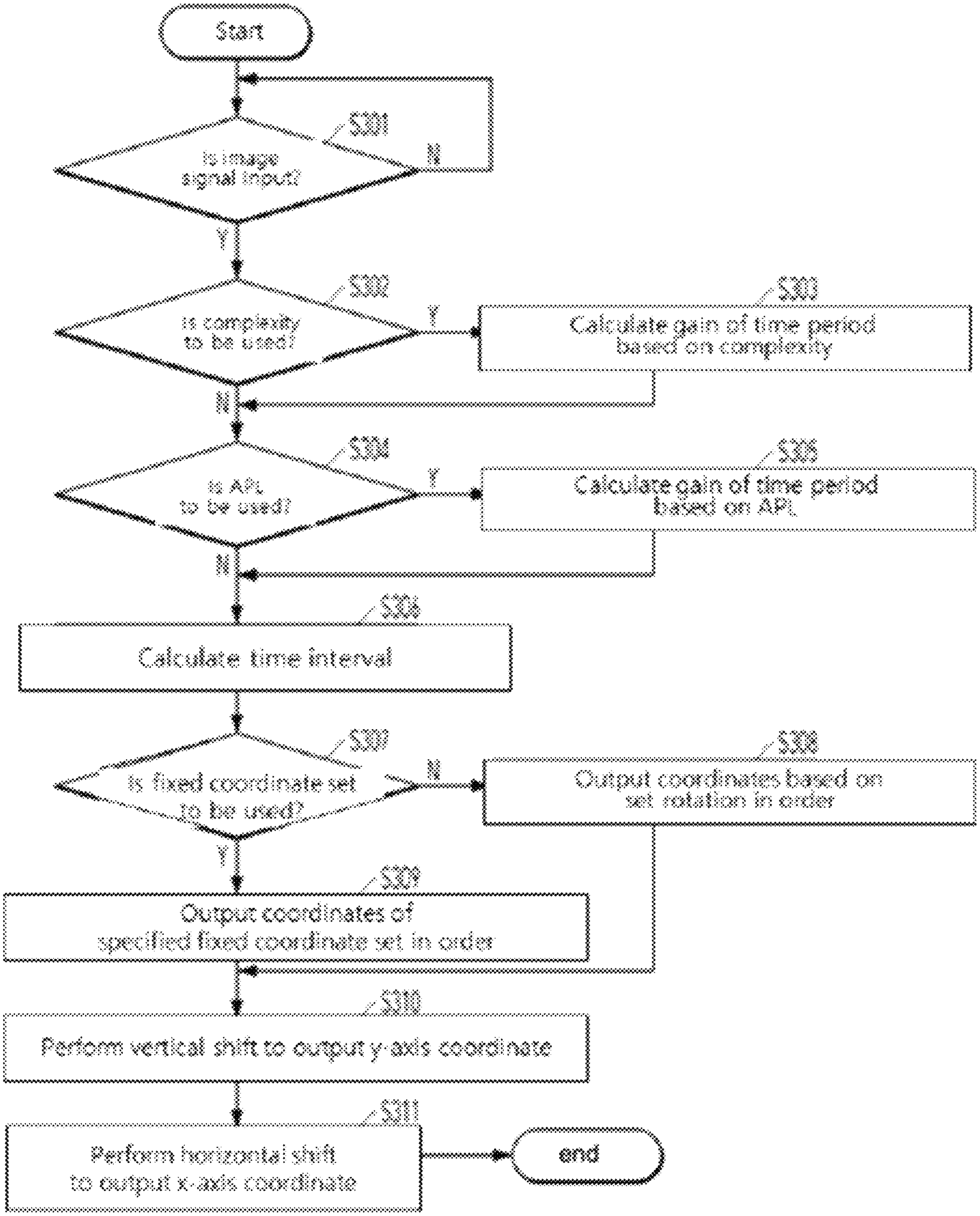
FIG. 5 is a flowchart illustrating a method for controlling a display apparatus according to one aspect of the present disclosure.

FIG. 5 is a flowchart illustrating a method for controlling a display apparatus according to one aspect of the present disclosure.

The display apparatus according to one aspect of the present disclosure determines whether an image signal is received (operation S301).

When it is determined that the image signal is received as a result of the determination in operation S301, the display apparatus determines whether to use the complexity of the image signal (operation S302).

When it is determined that the complexity of the image signal is to be used as a result of the determination in operation S302, a gain of the time (period) according to the complexity of the image signal is calculated (operation S303).

Further, it is determined whether to use the APL of the image signal (operation S304).

When it is determined that the APL of the image signal is to be used as a result of the determination in operation S304, a gain of the time (period) according to the APL of the image signal is calculated (operation S305).

A final shift time of pixels is determined based on at least one of the complexity of the image signal calculated in operation S303 or the APL of the image signal calculated in operation S305 (operation S306). Related details will be described below with reference to FIGS. 7 and 8.

Further, the display apparatus according to one aspect of the present disclosure determines whether to use a fixed coordinate set (operation S307).

When it is determined that the fixed coordinate set is not to be used as a result of the determination in operation S307, one of a plurality of coordinates according to a set rotation is output in order (operation S308).

On the other hand, when it is determined that the fixed coordinate set is to be used as a result of the determination in operation S307, the specified fixed coordinate set is output (operation S309).

Based on the track coordinate information output in operation S308 or S309 and the final shift time of the pixels determined in operation S306, the received image signal is designed to be shifted in the vertical direction and output (operation S310) and to be shifted in the horizontal direction and output (operation S311).

In brief, the display apparatus according to one aspect of the present disclosure receives an image signal.

Further, the display apparatus calculates at least one of a complexity or APL of the received image signal.

Further, the display apparatus determines a final shift time of pixels based on at least one of the calculated complexity or APL of the image signal.

Then, based on the track coordinate information stored in the memory and the determined final shift time of pixels, the display apparatus may shift the received image signal in a horizontal direction or a vertical direction and output the same, thereby mitigating the degradation of image quality.

Operation S303 will be described in more detail below with reference to FIG. 5, and operation S305 will be described in more detail below with reference to FIG. 7.

Figure 6:
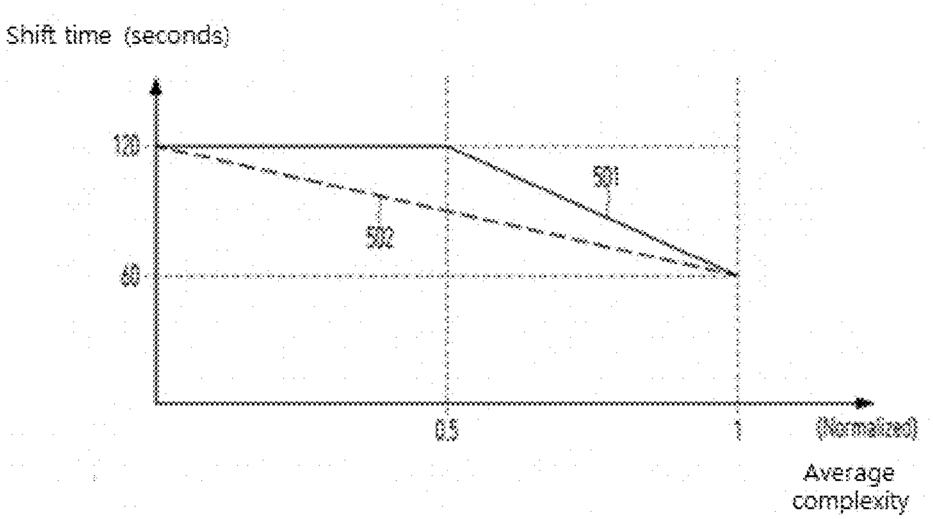
FIG. 6 is a graph illustrating determining, by a display apparatus according to one aspect of the present disclosure, a pixel shift time based on a complexity of an image signal.

FIG. 6 is a graph illustrating determining, by a display apparatus according to one aspect of the present disclosure, a pixel shift time based on a complexity of an image signal.

The complexity of the image signal may be calculated by adding up all the values obtained through an edge detection filter (e.g., Sobel filter). As the value obtained through the edge detection filter increases, the complexity of the image signal is considered to be higher.

Furthermore, as the complexity of the image signal increases, the final shift time of pixels is set to a shorter time. This is because higher complexity means that the image has more edges, which may be better perceived by the user's eyes when degraded.

The complexity of an image signal may be determined based on the average complexity of multiple frames. For example, taking the average complexity of the last 120 frames is also within the scope of the present disclosure.

The first aspect 501 represents a case where the image complexity is maintained and then decreased over the shift time, and the second aspect 502 represents a case where the image complexity is decreased from the beginning.

In the first aspect 501, the final shift time of the pixels starts to decrease only when the complexity of the image signal exceeds a preset value (0. 5).

On the other hand, in the second aspect 502, the final shift time of the pixels is designed to decrease proportionally regardless of whether the complexity of the image signal reaches the preset value (0. 5). Both the first aspect 501 and the second aspect 502 illustrated in FIG. 5 fall within the scope of the present disclosure.

Figure 7:
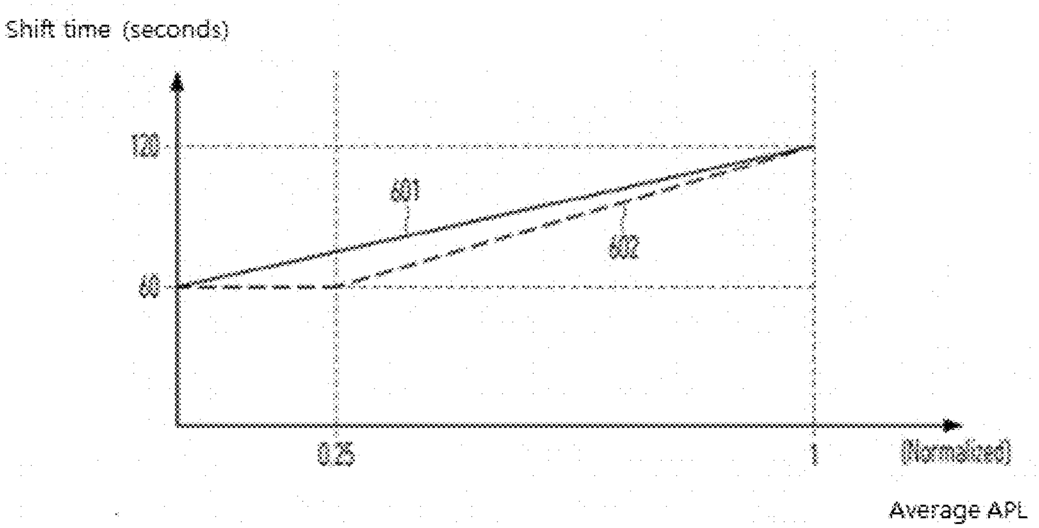
FIG. 7 is a graph illustrating determining, by a display apparatus according to one aspect of the present disclosure, a pixel shift time based on an APL.

FIG. 7 is a graph illustrating determining, by a display apparatus according to one aspect of the present disclosure, a pixel shift time based on an APL.

According to one aspect of the present disclosure, the average of the Y-values of all pixels may be used as the value of the APL. Alternatively, (R+G+B)/3 may be used instead of the Y-value. For reference, Y may be obtained as Y=0. 2126R+0. 7152G+0. 0722B. For example, R corresponds to data for a red pixel, G corresponds to data for a green pixel, B corresponds to data for a blue pixel, and Y corresponds to luminance data.

Further, according to one aspect of the present disclosure, the shift time of the pixels is adjusted according to the value of the APL obtained above. As the APL decreases, the shift time of the pixels is set to be shorter.

The design takes into account that a low APL increases the peak luminance, and in this case, the pixels in a small region emit high luminance, which leads to severe degradation.

Alternatively, the APL of an image signal may be based on the average of multiple frames. For example, using an average of the APLs of the last 120 frames is also within the scope of the present disclosure.

The second aspect 602 represents a case where the APL is maintained and then increased over the shift time, while the first aspect 601 represents a case where the APL is increased from the beginning.

In the second aspect 602, the final shift time of the pixels starts to increase only when the APL of the image signal exceeds a preset value (0. 25).

On the other hand, in the first aspect 601, the final shift time of the pixels is designed to increase proportionally regardless of whether the APL of the image signal reaches the preset value (0. 25). Both the first aspect 601 and the second aspect 602 illustrated in FIG. 7 fall within the scope of the present disclosure.

According to another aspect of the present disclosure, the gain of the shift time of the pixel according to the complexity of the image signal and the APL may be normalized to 0 to 1.

The gain of the shift time according to the complexity of the image signal is defined as a first gain, and the gain of the shift time according to the APL of the image signal is defined as a second gain.

According to the present disclosure, however, at least one of the first gain or the second gain may be used.

[Final shift time interval of pixels=default time (e.g., 120 seconds)×first gain×second gain].

When the first gain=0.7, the second gain=0.8, and both gains are applied,

Final shift time interval of pixels=120 (seconds)×0.7×0.8=67 seconds

If only the first gain=0.7 is applied,

Final shift time interval of pixels=120 (seconds)×0.7=84 seconds

If only the second gain=0.8 is applied,

Final shift time interval of pixels=120 (seconds)×0.8=96 seconds

Figure 8:
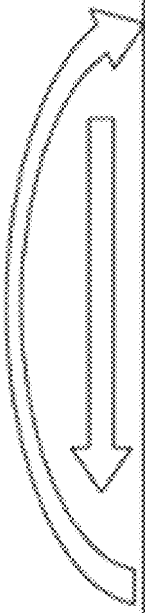
FIG. 8 illustrates an exemplary table of track coordinate information about a pixel used by a display apparatus according to one aspect of the present disclosure.
Figure 9A:
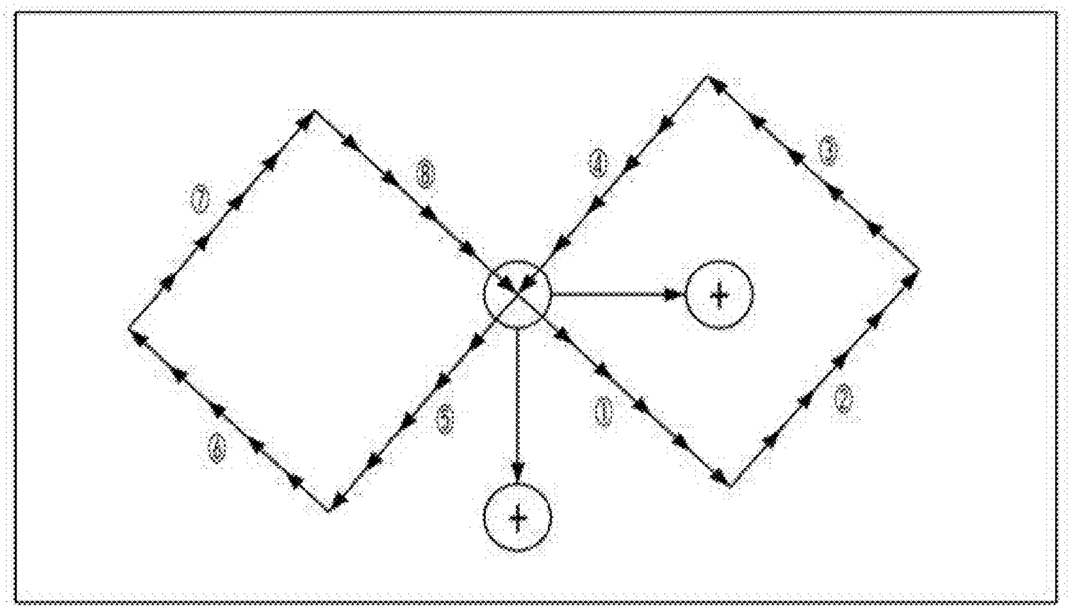
FIG. 9A and FIG. 9B illustrate a process in which a position of an image signal is changed and output based on the table shown in FIG. 8.
Figure 9B:
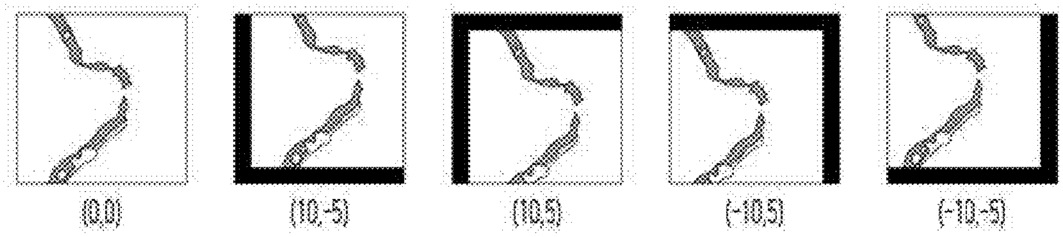

FIG. 8 illustrates an exemplary table of track coordinate information about a pixel used by a display apparatus according to one aspect of the present disclosure. FIG. 9A and FIG. 9B illustrate a process in which a position of an image signal is changed and output based on the table shown in FIG. 8.

As shown in FIG. 8, track coordinate information about pixels is stored in the memory, for example, in a table format.

Table 1 below is an exemplary table, showing in more detail FIG. 7, which shows the shift track of the pixels around the center point (0, 0). As previously described, the shift is designed to be no more than +/−10 pixels along the X axis and no more than +/−5 pixels along the Y axis.

TABLE 1

| Order | x | y |
|---|---|---|
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 6 | 4 |
| 7 | 7 | 3 |
| 8 | 8 | 2 |
| 9 | 9 | 1 |
| 10 | 10 | 0 |
| 11 | 9 | −1 |
| 12 | 8 | −2 |
| 13 | 7 | −3 |
| 14 | 6 | −4 |
| 15 | 5 | −5 |
| 16 | 4 | −4 |
| 17 | 3 | −3 |
| 18 | 2 | −2 |
| 19 | 1 | −1 |
| 20 | 0 | 0 |
| 21 | −1 | 1 |
| 22 | −2 | 2 |
| 23 | −3 | 3 |
| 24 | −4 | 4 |
| 25 | −5 | 5 |
| 26 | −6 | 4 |
| 27 | −7 | 3 |
| 28 | −8 | 2 |
| 29 | −9 | 1 |
| 30 | −10 | 0 |
| 31 | −9 | −1 |
| 32 | −8 | −2 |
| 33 | −7 | −3 |
| 34 | −6 | −4 |
| 35 | −5 | −5 |
| 36 | −4 | −4 |
| 37 | −3 | −3 |
| 38 | −2 | −2 |
| 39 | −1 | −1 |
| 40 | 0 | 0 |

According to FIG. 8 and Table 1 above, the entire image is shifted, as shown in FIG. 9A. In particular, in the x-axis direction, (+) indicates an increase in value to the right. In contrast, in the y-axis direction, (+) indicates an increase in value downward. Of course, it should be noted that it is within the scope of the present disclosure to set the shift direction of (+) differently.

Accordingly, as shown in FIG. 9B, the entire image changes along the path of shift, and the blank space created by the change in pixel position is designed to be processed in black.

Figure 10:
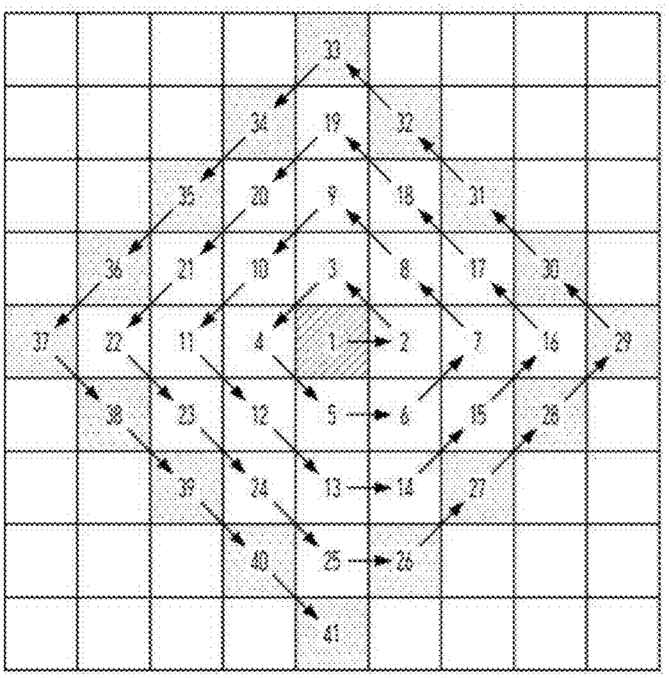
FIG. 10 sequentially illustrates an example of a path along which a display apparatus according to one aspect of the present disclosure changes a position of an image signal.
Figure 11:
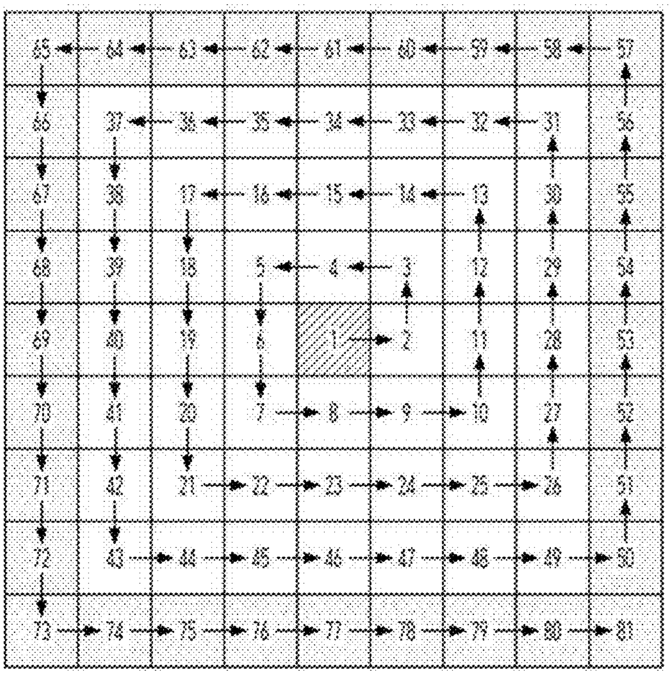
FIG. 11 sequentially illustrates another example of a path along which a display apparatus according to one aspect of the present disclosure changes a position of an image signal.

FIG. 10 sequentially illustrates an example of a path along which a display apparatus according to one aspect of the present disclosure changes a position of an image signal. FIG. 11 sequentially illustrates another example of a path along which a display apparatus according to one aspect of the present disclosure changes a position of an image signal.

According to one aspect of the present disclosure, the track shape that serves as the basis for the path along which pixels are shifted may be configured in various ways. Multiple track coordinate sets may be stored and any one of them may be selected and used.

In other words, as a first aspect, it is within the scope of the present disclosure to design a specific track coordinate set for fixed operation.

As a second aspect, it is also within the scope of the present disclosure to design the apparatus to operate by selecting a plurality of track coordinate sets (e.g., as shown in FIGS. 10 and 11) on a regular or irregular basis.

In other words, after a time of final shift of the pixels to a particular preset track coordinate set (FIG. 8), the pixels may be repositioned to the same particular track coordinate set (FIG. 8).

Alternatively, after the time of final shift of the pixels to a first track coordinate set (FIG. 10), the pixels may be repositioned to a different second track coordinate set (FIG. 11). This design requires multiple track coordinate sets to be stored in the memory, but may be more beneficial for improving image quality degradation.

The examples of the present disclosure may be embodied as computer readable code on a medium on which a program is recorded. The computer readable medium includes all kinds of recording devices capable of storing data readable by a computer system is stored. Examples of computer-readable media include applications, hard disk drives (HDDs), solid state disks (SSDs), silicon disk drives (SDDs), ROMs, RAMs, CD-ROMs, magnetic tapes, floppy disks, and optical data storage devices, and also include those implemented in the form of carrier waves (e.g., transmission over the Internet).

Specific aspects of the data processing apparatus and method according to the present disclosure have been described. However, it should be noted that the aspects are merely exemplary, and aspects of the present disclosure are not limited thereto. Thus, the present disclosure should be construed as having the widest scope corresponding to the principles and novel features disclosed herein. A person skilled in the art may practice unspecified aspects by combining or substituting the disclosed aspects, without departing from the scope of the present disclosure. it will be apparent to those skilled in the art that various modifications and variations may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display apparatus comprising:
- an interface configured to receive an image signal;
- a memory having track coordinate information stored therein;
- a first calculator configured to calculate a complexity of the received image signal;
- a second calculator configured to calculate an average picture level (APL) of the received image signal; and
- a controller configured to:
  - determine a final shift time of pixels based on the calculated complexity and APL of the image signal; and
  - control the received image signal to be shifted in a horizontal direction or a vertical direction and output, based on the track coordinate information stored in the memory and the determined final shift time of the pixels,
  - wherein a set of the track coordinate information is randomly selected from among the sets of track coordinate information after an end of the final shift time of the pixels.

2. The display apparatus of claim 1, wherein the complexity of the received image signal is inversely proportional to the final shift time of the pixels, and
- wherein the APL of the received image signal is proportional to the final shift time of the pixels.

3. The display apparatus of claim 1, wherein the controller determines the final shift time as a product of a default time, a first gain of a shift time according to the calculated complexity of the image signal, and a second gain of a shift time according to the calculated APL of the image signal, and
- wherein the first gain and the second gain are in a range of 0 to 1.

4. The display apparatus of claim 1, wherein a plurality of sets of the track coordinate information is stored in the memory.

5. The display apparatus of claim 1, wherein the shift of the image signal in the horizontal is limited to a maximum of 10 pixels, and
- wherein the shift of the image signal in the vertical direction is limited to a maximum of 5 pixels.

6. The display apparatus of claim 5, when the image signal is shifted, the portion of the image signal that is shifted out of the screen is deleted and blank area is output in black.

7. The display apparatus of claim 1, wherein the track coordinate information stored in the memory is unchanged.

8. The display apparatus of claim 7, when the image signal is shifted in the horizontal direction based on the track coordinate information stored in the memory, the image signal is unchanged in the vertical direction.

9. The display apparatus of claim 7, when the image signal is shifted in the vertical direction based on the track coordinate information stored in the memory, the image signal is unchanged in the horizontal direction.

10. A method for controlling a display apparatus, the method comprising:
- receiving an image signal;
- calculating at least one of a complexity or an average picture level (APL) of the received image signal;
- determining a final shift time of pixels based on the at least one of the calculated complexity or APL of the image signal; and
- shifting the received image signal in a horizontal direction or a vertical direction and outputting the shifted image signal, based on track coordinate information stored in a memory and the determined final shift time of the pixels,
- wherein a set of the track coordinate information is randomly selected from among the sets of track coordinate information after an end of the final shift time of the pixels.

11. The method of claim 10, wherein the complexity of the received image signal is inversely proportional to the final shift time of the pixels,
- wherein the APL of the received image signal is proportional to the final shift time of the pixels.

12. The method of claim 10, wherein the determining of the final shift time of the pixels comprises:
- determining the final shift time as a product of a default time, a first gain of a shift time according to the calculated complexity of the image signal, and a second gain of a shift time according to the calculated APL of the image signal,
- wherein the first gain and the second gain are in a range of 0 to 1.

13. The method of claim 10, wherein a plurality of sets of the track coordinate information is stored in the memory.

14. The method of claim 10, wherein the shift of the image signal in the horizontal is limited to a maximum of 10 pixels,
- wherein the shift of the image signal in the vertical direction is limited to a maximum of 5 pixels.

15. The method of claim 14, when the image signal is shifted, the portion of the image signal that is shifted out of the screen is deleted and blank area is output in black.

16. The method of claim 10, wherein the track coordinate information stored in the memory is unchanged.

17. The method of claim 16, when the image signal is shifted in the horizontal direction based on the track coordinate information stored in the memory, the image signal is unchanged in the vertical direction.

18. The method of claim 16, when the image signal is shifted in the vertical direction based on the track coordinate information stored in the memory, the image signal is unchanged in the horizontal direction.

19. The method of claim 10, wherein the display apparatus corresponds to a television, an image processor, a source driver IC or a timing controller.

* * * * *